April 13, 1937. A. G. HEGGEM 2,076,840
VALVE
Filed Nov. 7, 1935 6 Sheets-Sheet 1

Inventor:—
Alfred G. Heggem,
By Smith, Michael & Gardiner,
Attorneys.

April 13, 1937. A. G. HEGGEM 2,076,840
VALVE
Filed Nov. 7, 1935 6 Sheets-Sheet 2
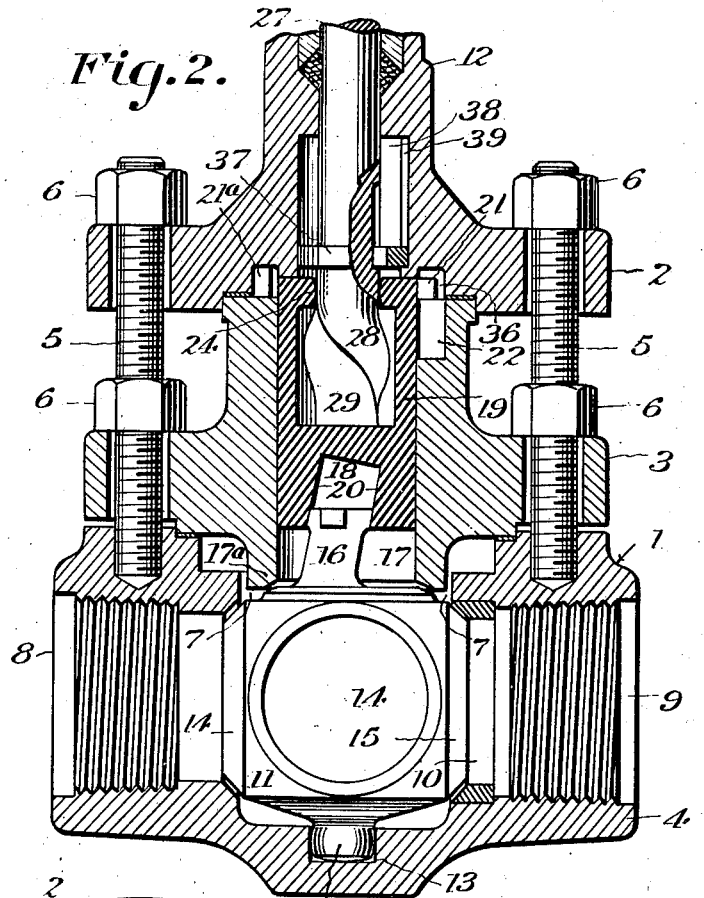
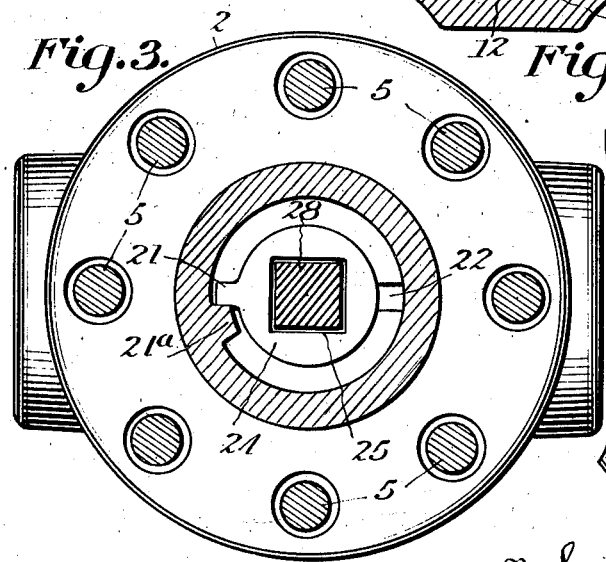
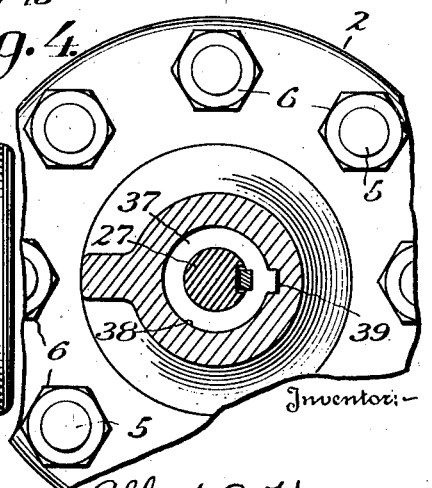
Inventor:-
Alfred G. Heggem,
By Smith, Michael & Gardiner,
Attorneys.

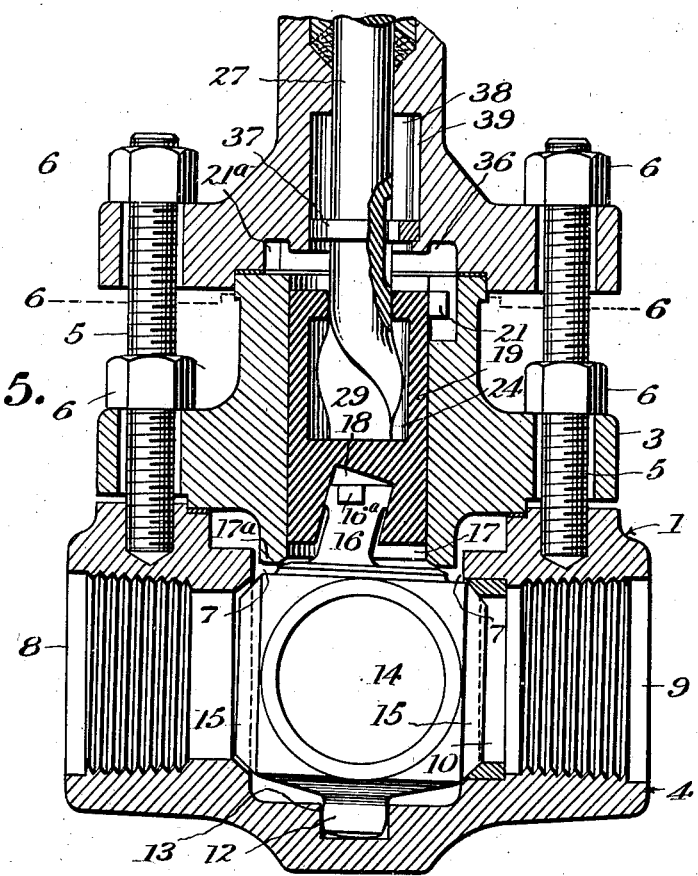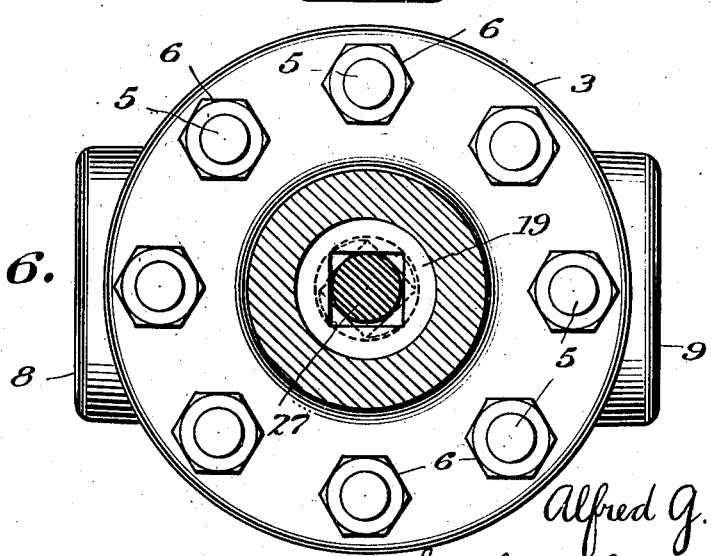

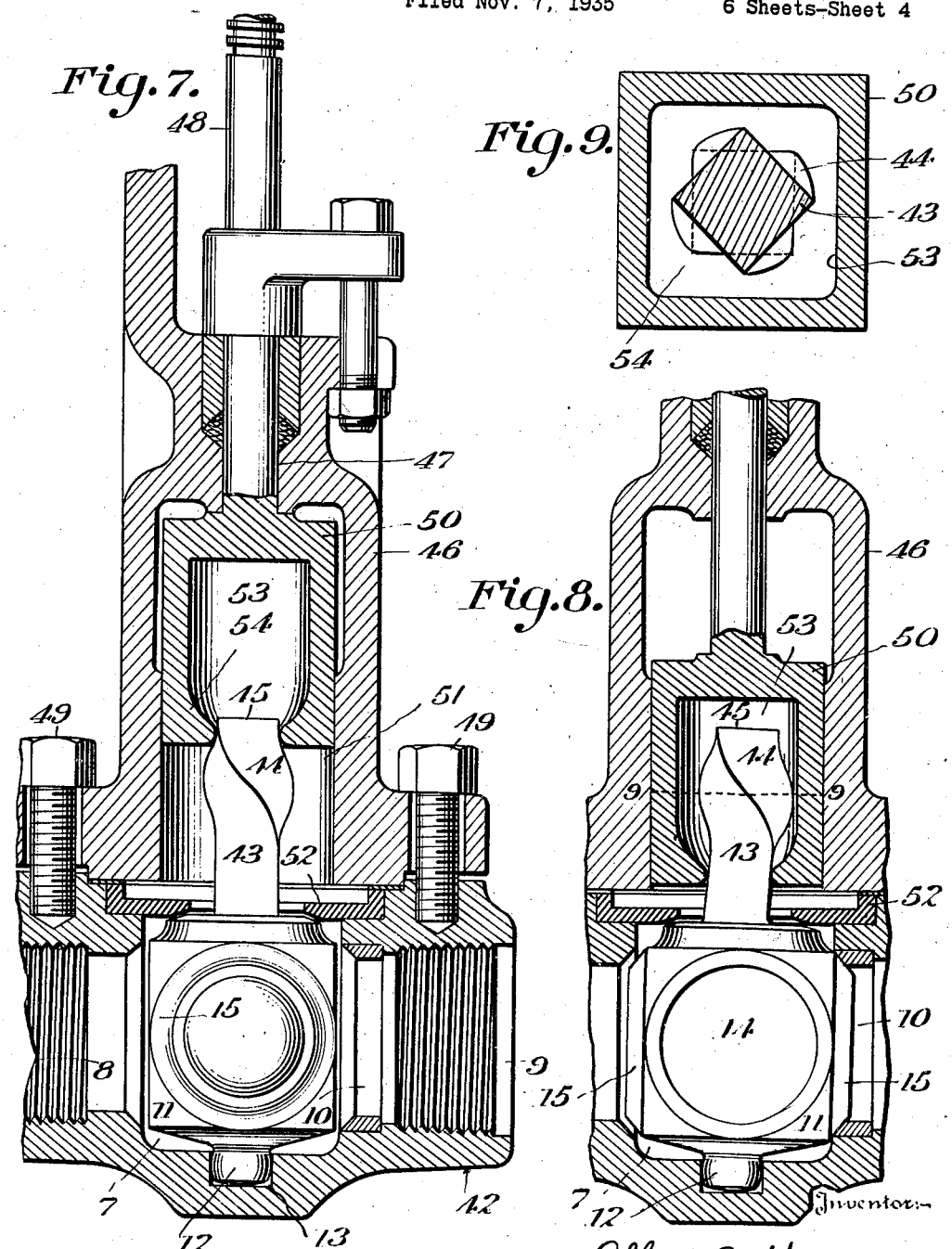

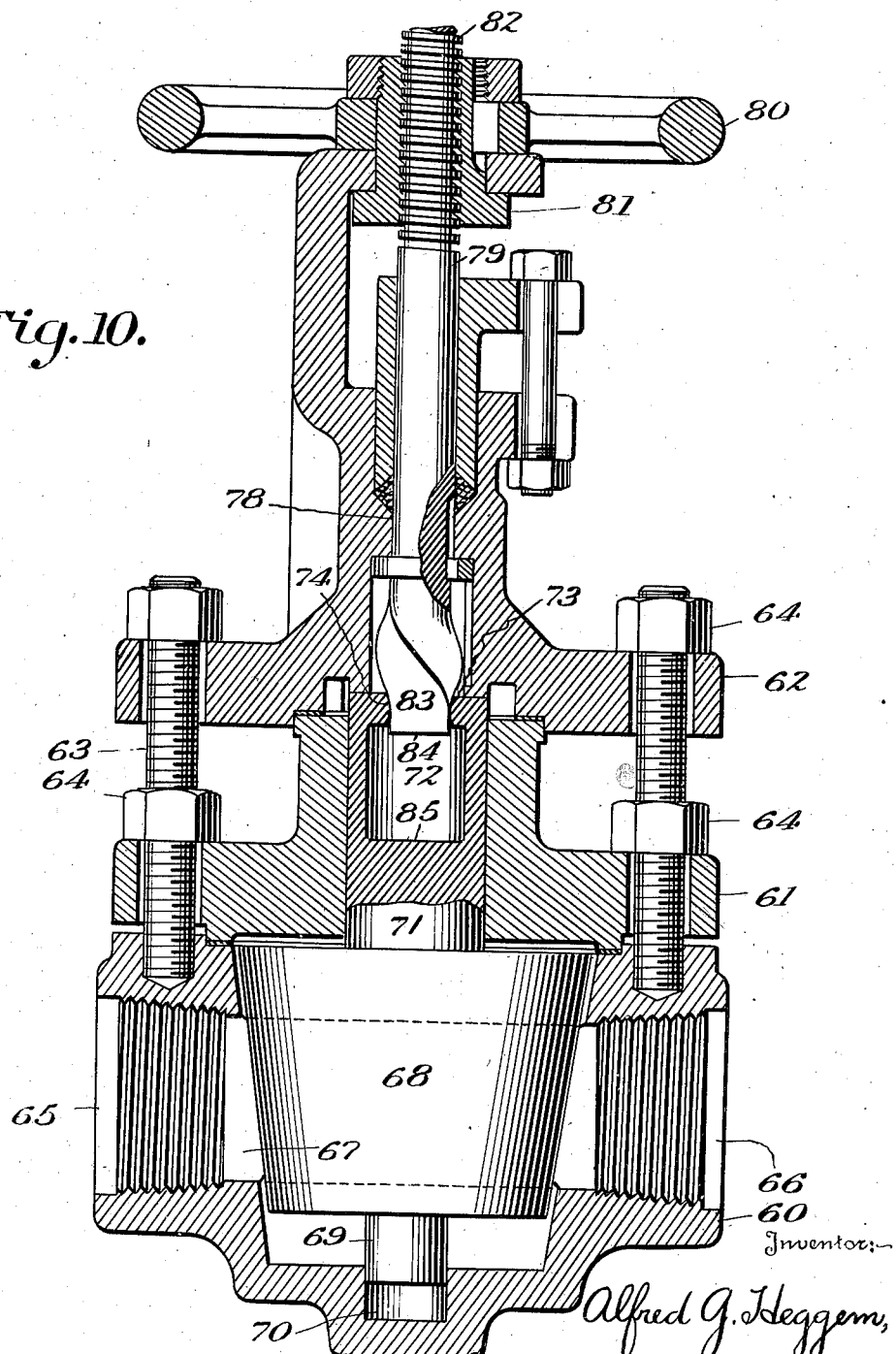

Patented Apr. 13, 1937

2,076,840

UNITED STATES PATENT OFFICE 2,076,840

VALVE

Alfred G. Heggem, Tulsa, Okla., assignor of one-third to Ed D. Ligon and one-third to William O. Ligon, both of Tulsa, Okla.

Application November 7, 1935, Serial No. 48,738

15 Claims. (Cl. 251—91)

This invention relates generally to valves, and is particularly concerned with valves of the type wherein a movable valve core or fluid flow controlling element in being moved from open to closed positions, and vice versa, partakes of a compound motion of rotative and non-rotative movements sequentially or alternatively. A valve of the type here referred to is illustrated in my former Patent No. 1,989,009 issued January 22, 1935.

Valves of the type referred to have marked utility in instances where it is desired to control fluids under relatively high pressures such as exist in oil well casings, pipe lines and the like. In these and similar instances it is necessary to insure the fluid flow controlling element of the valve being seated firmly and positively against the valve seat in order to prevent leakage. With these facts in mind, therefore, the present invention has for an object the provision of improved means for moving a valve of this type from open to closed position and to and from firm seating engagement with the valve seat whereby to preclude the possibility of leakage.

The invention also has in mind the provision of operating and control means for a valve of the type referred to which will be simple in construction, yet efficient and powerful in operation for the purpose of operating the valve with ease against the relatively high pressures encountered in use.

A further object of the invention is to provide means for converting uniform motion of an operating instrumentality into sequential and alternate rotative and non-rotative movements of the valve core.

More particularly, the invention contemplates providing a valve operating mechanism of the character indicated which shall include a helical couple designed to convert the uniform motion of the operating element into rotative and non-rotative motions and transmit these motions sequentially and alternatively to the valve core in moving from open to closed position and vice versa.

The invention further contemplates the provision of operating means of the character described which is equally applicable to valves which partake of rotative and reciprocating movements in moving from open to closed position, as well as to valves which partake of rotative and rocking or tilting movements in moving from open to closed position and vice versa.

These and other objects of the invention will become apparent from a consideration of the following specification read in connection with the accompanying drawings, wherein I have illustrated certain preferred embodiments of my invention, the novel features of which have been pointed out more particularly in the appended claims.

In the accompanying drawings:—

Fig. 2 is a fragmentary central, vertical sectional view of the valve shown in Fig. 1, and showing the position of the parts after the valve core has been rotated toward closed position but before the said core has been tilted to move the core into contact with the cooperating valve seat.

Fig. 3 is a transverse sectional view on the line 3—3 of Fig. 1.

Fig. 4 is a transverse sectional view on the line 4—4 of Fig. 1.

Fig. 5 is a fragmentary central, vertical sectional view of the valve shown in Figs. 1 and 2, and showing the position of parts after the valve core has been rotated and tilted to fully closed position.

Fig. 6 is a transverse sectional view on the line 6—6 of Fig. 5.

Fig. 7 is a fragmentary central, vertical sectional view of a modified form of valve core actuating mechanism embodying the features of my present invention, and showing the valve core in open position.

Fig. 8 is a fragmentary central, vertical sectional view of the valve shown in Fig. 7, and showing the position of parts after the valve core has been rotated and tilted to closed position.

Fig. 9 is a transverse sectional view on the line 9—9 of Fig. 8.

Fig. 10 is a central, vertical sectional view of a valve including a combined rotary and axially movable valve core and embodying the features of my present invention, this figure showing the valve in open position.

Figure 11:
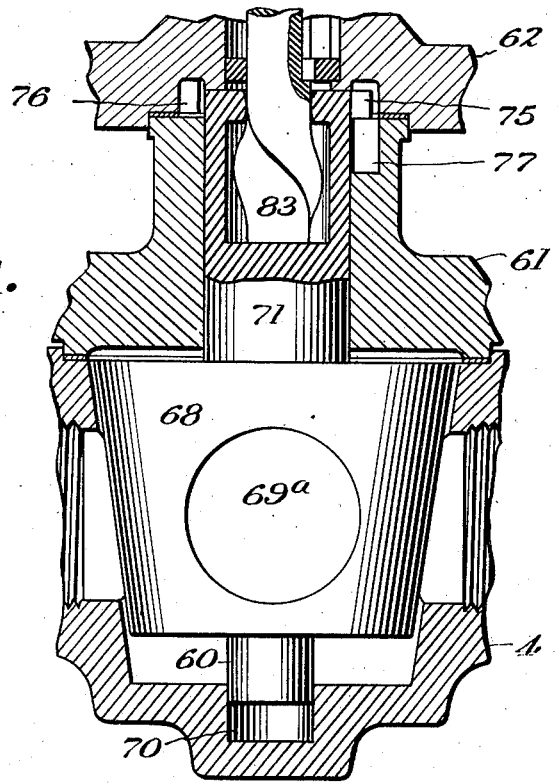
Figure 12:
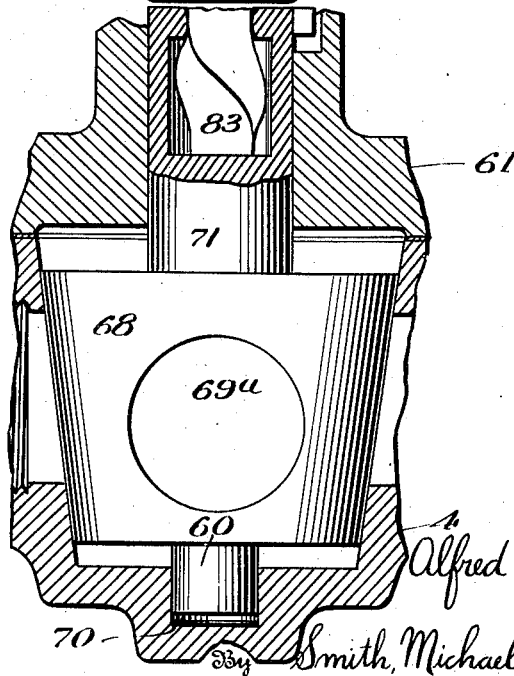

Fig. 11 is a fragmentary central, vertical sectional view of the valve shown in Fig. 10, and showing the position of parts after the valve core has been rotated to a position where further rotation of the valve hand-wheel moves the valve core downwardly into fully closed position, and Fig. 12 is a fragmentary central, vertical sectional view of the valve shown in Figs. 10 and 11, and showing the position of parts after the valve core has been rotated and moved to fully closed position.

Referring more particularly to the accompanying drawings wherein like reference numerals have been used to designate like parts throughout, Figs. 1 to 6 disclose one preferred embodiment of my invention as applied to a valve requiring a combined motion of rotative and rocking movements in being moved from open to closed position and vice versa. In the modification here referred to the valve body or casing, indicated generally by the reference numeral 1, is shown as comprising three casing sections numbered 2, 3, and 4 arranged in superposed relation and operatively secured together by means of stud members 5 and associated nut elements 6. The lower casing section 4 is provided with a fluid passage comprising a central, substantially cylindrical chamber 7 communicating with opposed fluid passages 8 and 9, the passage 8 being the inlet passage to the valve and the passage 9 being the outlet passage therefrom. The outlet passage 9 adjacent its inner end which is in communication with the chamber 7, is provided with a hardened valve seat ring 10, provided with an annular beveled face with which a valve core 11 movably mounted within the chamber 7 cooperates for the purpose of controlling the flow of fluid through the passages 8 and 9.

Figure 1:
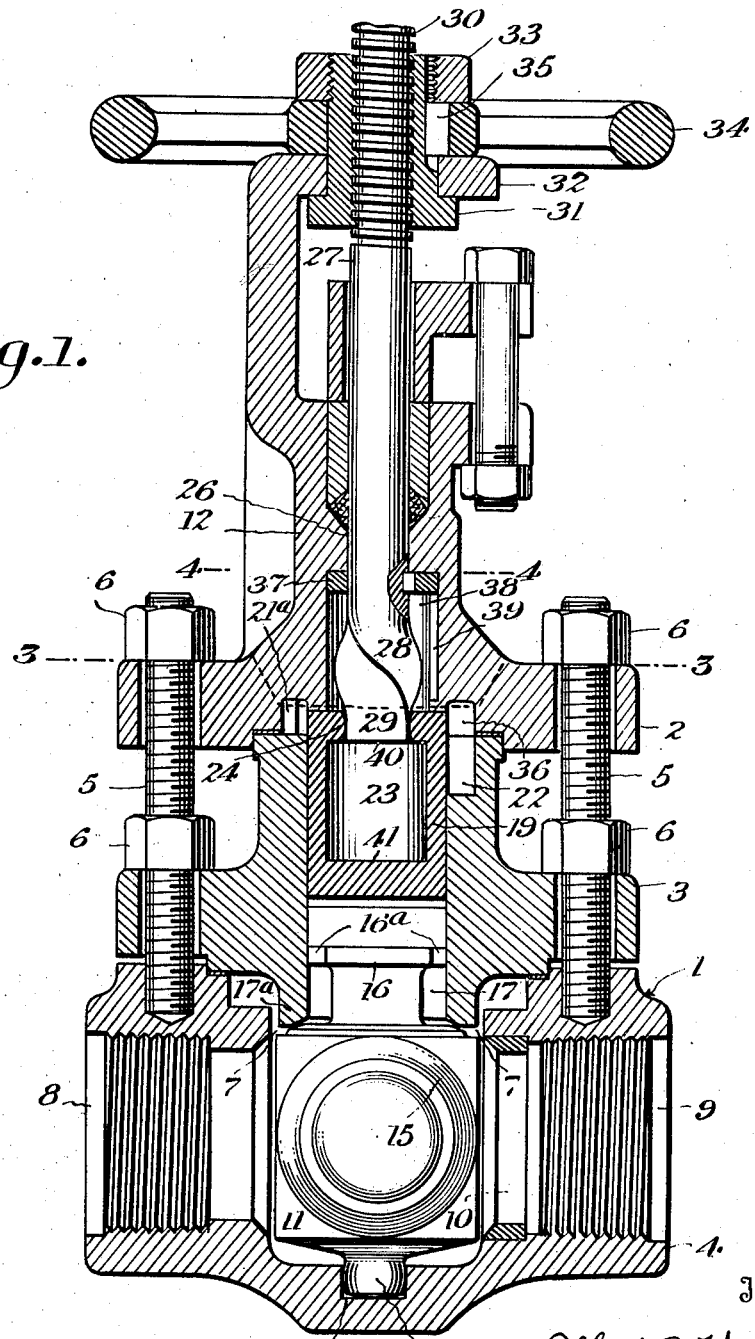
Figure 1 is a central, vertical sectional view of a valve including a valve core having rotary and tilting movements and embodying the features of one form of my present invention, this figure showing the valve in open position.

The valve member 11 is provided on its lower face with a trunnion 12 which is received within a recess 13 provided in the bottom wall of the chamber 7, centrally thereof. The trunnion 12 is provided with a generally spherical outer surface for the purpose of providing for rotative and non-rotative movements of the valve 11 within the chamber 7. In the particular modification here under consideration, the non-rotatable increment of valve movement is of a rocking or tilting character about an axis transverse to the axis of rotation of the valve 11. The valve core 11 is provided with a transverse fluid passage 14 extending completely through the body of the valve core, which passage in the open position of the valve, is in substantial alignment with the passages 8 and 9, as shown in Fig. 1 of the drawings. The valve core is further provided with valve seat engaging portions 15, either one of which, when the valve is moved substantially 90 degrees from the position shown in Fig. 1, will be brought into alignment with the valve seat 10 for subsequent movement into engagement therewith in a manner to be hereinafter described. The valve core 11 is further provided on the upper face opposite to the face which carries the trunnion 12, with an extension 16. Said extension is disposed eccentrically with respect to the axis of rotation of the valve core, as shown in Fig. 2, and extends upwardly from the top surface of the valve in inclined relation to said axis of rotation. The extension 16 terminates in a cross head 16ª which is arranged for connection with the operating mechanism of the valve in a manner such that the valve core may be alternatively and sequentially moved rotatably and non-rotatably, in a manner to be hereinafter described.

Referring further to the chamber 7 provided in the lower valve casing section 4, it is to be noted that this chamber is substantially cylindrical and of a diameter slightly exceeding the major transverse dimensions of the valve core 11, and opens upwardly through the top of the section 4 to provide means for readily inserting and removing the valve core 11 with respect to the casing section 4. It is also to be noted that the distance between the points of communication of the inlet and outlet passages 8 and 9 with the chamber 7, respectively, is slightly greater than the over-all transverse dimension of the valve core 11 to permit free rotation of the core within the chamber and for allowing the core to be rocked about a transverse axis for the purpose of bringing one of the faces 15 of the valve core into operative engagement with the valve seat 10 in the closed position of the valve shown in Fig. 5.

The intermediate valve casing section 3 is provided with a cylindrical bore 17 extending entirely through the valve section, and said section 3 is secured to the lower section 4 with the axis of the bore 17 in vertical alignment with the axis of rotation of the valve. Furthermore, the section 3 is provided with an annular flange or extension 17ª adjacent the lower end thereof which overlies and is immediately adjacent to the upper top surface of the valve core 11 to prevent displacement of the valve upwardly by reason of fluid pressure operating against the lower surface of the valve. As shown in Figs. 1 and 2, the extension 16 of the valve core 11 extends up into the bore 17 of valve casing section 3 an appreciable extent and the cross head 16ª thereof is received within a slot 18 provided in the lower portion of a cylindrical member 19 mounted for rotation and axial reciprocation within the bore 17. The member 19 is in the form of a cylindrical plug and the slot 18 in the lower portion thereof extends completely through the plug transversely thereof opening through the side and end wall surfaces thereof, as clearly shown in Figs. 1 and 2. The side walls 20 defining the slot 18 are inclined with respect to the axis of the plug 19, the degree of inclination thereof corresponding to that of the extension 16 carried by the valve core 11. The plug member 19 is arranged for axial reciprocation and rotation within the bore 17 and for this purpose has connection to an operating member to be hereinafter referred to. For the purposes of controlling the movement of the member 19, the same is provided with a lug 21 extending laterally or radially therefrom at the upper end thereof. Said lug 21 is arranged to ride upon the upper flat surface of the valve casing section 3 during rotation of the member 19, and is guidingly received within a groove 22 formed in the upper surface of the bore 17 during axial reciprocation of the member 19. It will be noted from an inspection of Fig. 2 that the groove 22 extends longitudinally of the valve casing section 3 and opens into the bore 17 and out through the upper end wall of said section.

The plug member 19 is further provided with an inner chamber 23 adjacent the upper end thereof, said chamber being closed at its upper end by a wall member 24 having a centrally disposed non-circular opening 25, as shown in Fig. 3.

The upper valve casing section 2 is provided with an axially extending bore 26 within which is mounted an operating member 27. The operating member 27 at its lower extremities is provided with one or more helical surfaces 28 which terminate in a non-circular extremity 29 corresponding generally in contour to the non-circular opening 25 in the upper closure wall 24 of the member 19. This arrangement of parts is clearly shown in Fig. 1. The member 27 is mounted for reciprocation within the upper valve casing section 2 and for this purpose may be provided with a screw-threaded portion 30 at its upper extremity with which is associated a freely rotatable nut member 31 locked against movement axially of the member 27 by means of the shoulder 32 and locking nut 33. The nut 31 may be rotated within the shoulder 32 of the casing section 2 by any suitable means such as a hand wheel 34 keyed or otherwise secured to said nut 31 as at 35.

The valve casing section 2 is secured to the section 3 with the bore 26 thereof in axial alignment with the bore 17, and the lower face of said section 2 is provided with an annular recess 36 for the purpose of receiving the laterally extending lug 21 carried by the member 19. Thus, as the member 19 is rotated in response to movement of the operating member 27, in a manner to be hereafter described, the lug 21 passes over the upper surface of the casing section 3 within the recess 36 until in alignment with the groove 22 and thereafter moves axially within said groove for the purpose of restraining the member 19 against further rotation.

For the purpose of limiting the range of reciprocation of the operating member 27 to substantially that necessary to impart the desired degree of rotative and non-rotative movements of the valve core 11, suitable cooperating stop means may be provided such as a collar 37 carried by the operating member 27 and arranged to move within an enlarged portion 38 of the bore 26, said portion 38 of the bore being provided with suitable limiting stops or shoulders such as 39.

From the foregoing description it will be seen that the operating member 27 with the helical surfaces 28 in connection with the plug or nut member 19 form in effect what I choose to call a helical couple which will convert the reciprocating motion of the operating member 27 into alternate rotative and nonrotative motion and transmit these to the core member 11 for properly moving the same within the chamber 7. Thus, in considering the relation of parts as shown in Fig. 1, wherein the valve is in open position, when the hand wheel 34 is rotated in a counterclockwise direction, the operating member 27 is urged downwardly. Due to the engagement between the non-circular end portion 29 of the operating member 27 and the non-circular opening 25 in the nut member 19, the member 19 will rotate, carrying the lug 21 from the position shown in Fig. 3 to a position in alignment with the groove 22. During this portion of the movement, due to the lug 21 engaging the upper surface of the valve section 3, the member 19 is restrained against axial movement so that the helical portion 28 of the operating member 27 telescopes within the chamber 23 of the member 19. The pitch and length of the helical surface 28 are arranged so that upon rotation of the member 19 an amount sufficient to rotate the valve core 90 degrees, the end 40 of the operating member engages the bottom wall 41 of the chamber 23, as shown in Fig. 2, and further downward movement of the operator 27 causes a direct axial movement of the member 19. This axial movement of the member 19 is transmitted into rocking movement of the valve core 11 about an axis transverse to the axis of rotation thereof by means of the inclined disposition of the extension 16 carried by the valve core member and the sliding engagement between the cross-head 16ᵃ and the side walls of the groove 18. Thus, the initial downward motion of the member 27 is converted into rotary movement of the member 19, and through the slot 18 and cross head 16ᵃ said rotary motion is communicated directly and unchanged to the valve core member to rotate the same from the position shown in Fig. 1 to a position at right angles thereto (as shown in Fig. 2). Continued downward motion of the operating member 27 through the inclined extension 16 and inclined side walls 20 of the groove 18 is converted into non-rotative or rocking movement of the valve core 11 to bring an aligned valve face 15 of the core into firm and operative seating engagement with the valve seat 10 (as shown in Fig. 5). Assuming the valve to be in the closed position as shown in Fig. 5, rotation of the hand wheel in a clockwise direction will cause the valve operating member 27 to rise. The member 19 at this time being restrained against rotation by reason of the engagement of the lug 21 with the groove 22, said member 19 moves axially upwardly to rock the valve core 11 about the trunnion 12 to move the same from completely closed position to the position shown in Fig. 2, at which time the lug 21 passes out of engagement with the groove 22 and continued rising movement of the operating member 27 causes rotation of the member 19, and through its connection with the valve core through the cross head 16ᵃ, rotates the valve core 90 degrees into the fully open position shown in Fig. 1. If desired, the rotation of the member 19 may be limited by means of a stop lug 21ᵃ disposed within the recess 36, as shown in Fig. 3.

In Figs. 7, 8, and 9, I have shown a further modified form of my invention, wherein the members of the helical couple included in the driving mechanism between the valve operating member and the valve core are shown relatively reversed to the position they occupy in that form of the invention disclosed in Figs. 1 to 6 inclusive. The modification here referred to also includes a modified form of valve casing wherein only two casing sections are employed in lieu of the three sections shown in the modification first described.

Referring more particularly to the modification disclosed in Figs. 7, 8, and 9, it will be noted that the lower casing section 42 is similar in all essential respects to lower casing section 4 of the previously described modification, said section including inlet and outlet passages communicating with a central chamber in which a valve core is mounted for rotative and non-rotative movements about axes arranged transversely with respect to each other. For the sake of simplicity, these elements bear the same reference characters in Fig. 7 as have been employed with respect to the modification disclosed in Figs. 1 to 6 inclusive. The valve core 11 of Figs. 7, 8, and 9 is provided with an extension 43 on its upper face, said extension being disposed slightly eccentric with respect to the axis of rotation of the valve core 11 and having a slight inclination with respect to said axis. Said extension is preferably non-circular and is provided adjacent its free end with one or more helical surfaces 44 which terminate in a non-circular portion 45. Mounted upon the lower casing section 42 is an upper section 46 having a bore 47 designed to receive the valve operating member 48 in a manner similar in all respects to the construction shown in Figs. 1 to 6 inclusive with respect to the upper valve section 2 and the associated valve operating member 27. In the present embodiment, however, the valve casing 46 is secured directly to the lower casing 42 by means of any suitable means such as cap screws 49, said bore 47 being in axial alignment with the axis of rotation of the valve core 11. The valve operating member 48 is provided at its lower extremity with an enlarged head member 50 which is received within an enlarged portion 51 of the bore 47, said enlarged bore portion 51 opening into the upper open end of the valve core chamber 7 of the section 42, there being interposed between the sections 42 and 46 a suitable confining baffle ring 52 which takes the place of the flange 17ᵃ of the modification shown in Figs. 1 to 6 and functions to prevent upward displacement of the valve core 11.

The enlarged head 50 carried by the valve operating member 48 at the lower extremity thereof is provided with a chamber 53 closed at its lower end by a transverse wall 54 which is provided with an axially disposed non-circular opening 55, the walls of said opening being generally rounded in vertical elevation as shown in Fig. 7 for a purpose to be hereinafter described. Furthermore, the configuration of said opening corresponds generally to the contour or configuration of the extension 43 of the valve core member 11, whereby when the wall portion 54 of said enlarged head 50 passes beyond the region of said extension 43 which is provided with the helical surfaces 44, the walls of the non-circular aperture 55 will slidingly engage the inclined walls of the extension 43, as shown in Fig. 8, for the purpose of tilting or rocking the valve about an axis transverse to its axis of rotation, for the purpose of moving the valve into fully closed position, such as shown in Fig. 8.

The operation of the valve shown in Figs. 7, 8, and 9 is as follows: Assuming the valve parts to be in the position shown in Fig. 7, counter-clockwise rotation of the hand wheel associated with the valve operating member 48 causes the downward movement of said member so that the enlarged head 50 moves downwardly upon the helical surfaces 44 of the extension 43 with the result that the valve core 11 is rotated about its trunnion 12 from a position shown in Fig. 7 to a position at right angles thereto. At this time the apertured wall 54 has passed beyond that portion of the extension 43 which is provided with the helical surfaces 44 and onto the non-circular portion thereof lying between the top surface of the valve core 11 and said helical surfaces. Further downward movement of the valve operator 48 causes a sliding engagement between the walls of the aperture 55 and the inclined walls of the extension 43, with the result that the valve core member 11 is rocked about an axis transverse to its axis of rotation into a fully closed position, such as shown in Fig. 8.

It is to be noted in connection with this form of the invention that no stops or guide means similar to the lug 21 and the cooperating recess 36 and groove 22 (such as shown in the modification disclosed in Figs. 1 to 6) are necessary, the restraining ring 52 directly preventing upward movement of the valve core 11 when the direction of movement of the valve operating member 48 is reversed to move the valve from the position shown in Fig. 8 to that shown in Fig. 7.

In Figs. 10, 11, and 12 I have illustrated a further preferred modification of my invention wherein reciprocation of an operating element, such as disclosed in the two previously described forms of my invention, may be converted into rotary and reciprocatory movement of a valve designed to partake of such movements in being moved from open to closed position and vice versa.

Referring more particularly to Figs. 10, 11, and 12, the valve casing comprises three sections similar to those shown in Fig. 1 which are here numbered 60, 61, and 62, said sections being arranged in superposed relation and operatively secured together by any suitable means such as stud bolts 63 and nuts 64. The lower section 60 is provided with inlet and outlet passages 65 and 66, respectively, which communicate with a central valve core chamber 67, said chamber opening through the top of the lower section 60 for the purpose of facilitating assembly of the valve core member 68 within the chamber 67. The valve core is generally frustro-conical in shape and is provided on its lower face with a trunnion 69 received within a recess 70 provided centrally in the lower wall of the chamber 67. The valve core is provided with a diametrically extending through passage 69ᵃ arranged in open position of the valve to be aligned with the inlet and outlet passages 65 and 66, respectively. The chamber 67 in the valve casing section 60 corresponds in general configuration to that of the valve 68, namely, frustro-conical, being of a slightly greater diameter than that of the valve. Also, the vertical height of the valve member 68 is slightly less than the vertical height of the chamber 67 to provide for limited reciprocation of the valve 68 within the chamber 67. Thus, when the valve is depressed to the lower portion of the chamber 67, as shown in Fig. 12, with the passage 69 out of alignment with the inlet and outlet passages 65 and 66, respectively, the valve is in fully closed position with the conical outer surface of the valve core firmly seated upon the conical inner surface of the chamber 67. When the valve is moved to open position it is moved from the depressed position shown in Fig. 12 to the elevated position shown in Fig. 11 to relieve the conical surfaces of the valve core 68 and chamber 67 of surface contact with respect to each other, and the valve is subsequently rotated into a position to bring the valve passage 69 into alignment with the casing passages 65 and 66.

For moving the valve in the manner just described, the valve is provided on its upper surface with a cylindrical extension 71 which is presented within a central bore provided in the intermediate valve casing section 61. Said extension 71 is provided with a chamber 72 in its upper portion, said chamber being closed at its open end by a transverse wall 73 having an axially disposed non-circular aperture 74 therein. The extension 71 is further provided with a laterally extending lug 75 similar in all respects to the lug 22 of the modification disclosed in Fig. 1. The lug 75 is designed to slidingly engage the upper surface 76 of the intermediate casing section 61 for the purpose of restraining said member 71 and the associated valve core member 68 against axial movement. The intermediate casing 61 is provided with an open groove 77 adjacent its upper end, said groove opening into the bore which receives the extension 71 and through the upper wall or surface of said casing section so that when the lug 75 becomes aligned with said groove 77, the axial extension 71 and attached valve core may move axially of the valve casing. The upper valve section 62 is provided with an axial bore 78 within which is mounted for reciprocation a valve operating member 79. The operating member 79 is provided at its upper extremity with a hand wheel 80 cooperating with a nut 81 and a threaded portion 82 provided on said operating member 79 for the purpose of reciprocating said member through rotation of the hand wheel. The lower portion of the operating core 79 is provided with one or more helical surfaces 83 which terminate in a non-circular portion 84 which is received within the non-circular aperture 74 of the wall 73 at the upper end of the extension 71.

In operation, assuming the valve to be fully opened as shown in Fig. 10, the hand wheel 80 is operated in a counterclockwise direction to cause downward movement of the operating member 79. The valve 68 being restrained against downward movement by reason of the engagement of the lug 75 with the surface 76 of the casing 62, rotates from the position shown in Fig. 10 to that shown in Fig. 11, at which time the lug 75 is aligned with the groove 77 and the end 84 of the member 79 is in abutting relation with the bottom wall 85 of the chamber 72, so that upon continued downward movement of the operator 79 the valve 68 is urged downwardly to bring its conical outer surface into engagement with the conical inner surface of the valve chamber 67, wherein the valve is in fully closed position as shown in Fig. 12. On a reversal of direction of rotation of the hand wheel 80, and assuming the parts to be in the position shown in Fig. 12, the valve 68 rises due to the fact that it is at that time restrained against rotational movement by means of engagement of the lug 75 in the groove 77. Upon continued upward movement of the operator 79 the lug 75 passes out of the groove 77, whereupon the valve is free to rotate and thereupon moves to the position shown in Fig. 10.

From the foregoing description it is apparent that I have perfected valve operating means of particular utility in connection with valves of the type wherein a valve core is sequentially or alternatively moved rotatably and non-rotatably from open to closed position and vice versa. Also, the valve operating means I have employed is equally applicable for moving valves wherein a rotatable movement followed by a tilting movement of the valve is required to move the valve from open to closed positions, as well as in instances wherein the valve must be moved rotatably and reciprocated in moving it from open to closed position.

Furthermore, it is apparent that by devising a valve operating mechanism including a helical couple, said operating means may be arranged so that the helical member of the couple may be operatively associated with either the valve core or the operating member therefor, and the nut member of the couple may be operatively associated with the other member of the couple.

Furthermore, the valve operating means employing a helical couple such as I have invented may be associated with a valve core in a manner such that the member of the couple which is associated with the core may be rigidly attached thereto or may have lost motion connection therewith.

It is also to be noted that the employment of a helical couple such as included in my valve operating mechanism may be operated to impart rotative and non-rotative movements to a valve core in response to continued movement of an operating member in one direction by the employment of suitable restraining means such as guide grooves and stops or, by properly arranging the elements of the couple, the rotative and non-rotative movements of the valve core may be obtained without such separate guide and stop means.

It will be understood that while I have shown and described certain preferred embodiments of my invention, this disclosure is not for the purpose of limiting my invention, but merely for the purpose of illustrating preferred embodiments thereof, and that any desired changes may be made in the arrangement of parts as fairly fall within the scope of the appended claims without departing from the spirit of the invention.

Having thus described my invention what I claim is:

1. In a valve including a valve body having a chamber provided with inlet and outlet ports, a valve core member mounted for rotative and non-rotative movements within the chamber, means for moving said valve core member comprising a valve operating member mounted for reciprocation with respect to said valve core member in a direction parallel to the axis of rotation of said valve core member, motion transmitting means connecting the valve operating member and said valve core member, said motion transmitting means including means for converting the reciprocatory movement of the valve operating member into rotary and non-rotary movements of the valve core member, and means for reciprocating the valve operating member with respect to said valve core member in a direction parallel to the axis of rotation of said valve core member.

2. In a valve including a valve body having a chamber provided with inlet and outlet ports, a valve core member mounted for rotative and tilting movements within the chamber, means for moving said valve core member comprising a valve operating member mounted for reciprocation, motion transmitting means connecting the valve operating member and said valve core member, said motion transmitting means including means for converting the reciprocatory movement of the valve operating member into rotary and tilting movements of the valve core member, and means for reciprocating the valve operating member.

3. In a valve including a valve body having a chamber provided with inlet and outlet ports, a valve core member mounted for rotative and reciprocating movements within the chamber, means for moving said valve core member comprising a valve operating member mounted for reciprocation with respect to said valve core member in a direction parallel to the axis of rotation of said valve core member, motion transmitting means connecting the valve operating member and said valve core member, said motion transmitting means including means for converting the reciprocatory movement of the valve operating member into rotary and reciprocating movements of the valve core member, and means for reciprocating the valve operating member with respect to said valve core member in a direction parallel to the axis of rotation of said valve core member.

4. The valve construction described in claim 1, wherein the motion converting means includes a helical surface provided on one of said members, and a nut member connected to the other of said members and operatively engaging said helical surface in motion transmitting relation thereto, and means for alternately restraining the valve core member against rotative and non-rotative motion whereby said valve core member is alternatively moved non-rotatably and rotated in response to reciprocation of the valve operating member.

5. The valve construction described in claim 2, wherein the motion converting means includes a helical surface provided on one of said members, and a nut member connected to the other of said members and operatively engaging said helical surface in motion transmitting relation thereto, and means for alternately restraining the valve core member against rotative and tilting motion whereby said valve core member is alternately tilted and rotated in response to reciprocation of the valve operating member.

6. The valve construction described in claim 3, wherein the motion converting means includes a helical surface provided on one of said members, a nut member connected to the other of said members and operatively engaging said helical surface in motion transmitting relation thereto, and means for alternately restraining the valve core member against rotative and reciprocating motion whereby said valve core member is alternately reciprocated and rotated in response to reciprocation of the valve operating member.

7. A valve including a chambered valve body having inlet and outlet ports communicating with the chamber, a valve core member mounted for rotative and non-rotative movements within said chamber, means for moving said valve core member comprising a valve operating member mounted for reciprocation, motion converting means connecting the valve operating member and said valve core member and including a helical surface provided on one of said members, and a nut member rigidly connected to said other member and operatively engaging said helical surface in motion transmitting relation, means for alternately restraining the valve core against rotary and non-rotary movement, the pitch and length of said helical surface being designed to rotate the valve core a predetermined extent while the valve core member is restrained against non-rotary movement, and cooperating means carried by the valve operating member and valve core member for non-rotatably moving the valve core when the same is restrained against rotation, and means for reciprocating the valve operating member.

8. A valve including a chambered valve body having inlet and outlet ports communicating with the chamber, a valve core member mounted for rotative and non-rotative movements within said chamber, means for moving said valve core member comprising a valve operating member mounted for reciprocation, motion converting means connecting the valve operating member and said valve core member and including a helical surface provided on one of said members and a nut member having connection with said other member permitting relative axial motion with respect thereto, said nut operatively engaging said helical surface in motion transmitting relation, means for alternately restraining the valve core against rotary and non-rotary movement, the pitch and length of said helical surface being designed to rotate the valve core a predetermined extent while the valve core member is restrained against non-rotary movement, and cooperating means for permitting relative axial movement between the nut and the member with which it is connected to move the valve core non-rotatably while restrained against rotary movement.

9. In a valve including a valve casing provided with a chamber having inlet and outlet ports communicating therewith, a valve core member mounted for rotary and non-rotary movements within said chamber, a valve operating member mounted for reciprocation, means for converting the reciprocating motion of said valve operating member into rotative and non-rotative movements of the core member, said means including a helical surface provided on the valve operating member, a nut member operatively connected to the valve core member and engaging said helical surface in motion converting relation, said helical surface being dimensioned and having a pitch such that predetermined movement of the valve operating member in one direction will rotate the valve angularly from open to closed position, and means carried by the operating member for abuttingly engaging said nut member for moving the same axially upon continued movement of the operator in the same direction.

10. In a valve including a valve casing provided with a chamber having inlet and outlet ports communicating therewith, a valve core member mounted for rotary and non-rotary movements within said chamber, a valve operating member mounted for reciprocation, means for converting the reciprocating motion of said valve operating member into rotative and non-rotative movements of the core member, said means including a helical surface provided on the valve operating member, a nut member operatively connected to the valve core member, said nut member being provided with a surface disposed in motion transmitting relation with the helical surface of the valve operating member and having an abutment in alignment with said operating member, means for restraining the nut member against axial movement during predetermined movement of the operator in one direction, and means for subsequently restraining the nut member against rotative movement while allowing the same to move axially, said operating member upon continued movement in the same direction engaging the abutment of said nut to so move the same.

11. In a valve including a valve casing having a chamber provided with inlet and outlet passages communicating therewith, a valve core mounted within the chamber for rotative and non-rotative movements therein, said valve core provided with an eccentrically disposed extension, a valve operating member mounted for reciprocation, means for reciprocating the valve operating member and a helical couple interposed between the operating member and said extension whereby to convert reciprocatory movement of the valve operating member into rotary and non-rotary movements of the valve core member.

12. In a valve including a valve casing having a chamber provided with inlet and outlet passages communicating therewith, a valve core mounted within the chamber for rotative and non-rotative movements therein, said valve core provided with an eccentrically disposed extension, a valve operating member mounted for reciprocation, means for reciprocating the valve operating member and a helical couple interposed between the operating member and said extension whereby to convert reciprocatory movement of the valve operating member into rotary and non-rotary movements of the valve core member, said helical couple comprising a nut member operatively associated with one of said members, and a helical surface provided on the other of said members.

13. In a valve including a valve casing having a chamber provided with inlet and outlet passages communicating therewith, a valve core mounted within the chamber for rotative and non-rotative movements therein, said valve core provided with an eccentrically disposed extension, a valve operating member mounted for reciprocation, means for reciprocating the valve operating member and a helical couple interposed between the operating member and said extension whereby to convert reciprocatory movement of the valve operating member into rotary and non-rotary movements of the valve core member, said helical couple including a hollow nut member associated with one of said members and having an abutment surface in substantial alignment with the axis of rotation of the valve core, a helical surface provided on the other of said members and in operative engagement with said nut member, means for restraining the valve core member against axial movement while permitting rotation thereof due to telescopic engagement between said hollow nut member and said helical surfaces upon movement of the valve operating member in one direction, and means for permitting axial movement of said valve core upon engagement of the operating member with said abutment surface upon continued movement of the valve operating member in the same direction.

14. In a valve including a valve body having a chamber provided with inlet and outlet ports, a valve core member mounted within said chamber for rotation and rocking movement, means for moving said valve core member including an operating member mounted for reciprocation, and motion transmitting and converting means interposed between said operating member and said valve core member, said motion converting and transmitting means including a helical couple including helical surfaces provided on the valve operating member, and a nut member operatively engaging said surface and having connection with the valve core member, said nut being provided with a slot having inclined side walls, an eccentrically disposed extension on the valve core member terminating in a cross head received within said slot, said extension having an inclination corresponding to that of the side walls of the slot and means for converting reciprocation of the valve operator into alternate rotary and reciprocatory movements of the nut member, whereby upon rotation of the nut said valve core member is rotated through the cross head connection with the nut, and when said nut is reciprocated axially, said valve core is rocked about an axis transverse to the axis of rotation due to the inclination of said extension and the inclined side walls of the slot.

15. A valve comprising a valve body having an inlet and an outlet opening, and provided with a chamber communicating with said openings, a rotatable valve core member positioned within the chamber to control the flow of fluid therethrough, an operating member movable axially with respect to said rotatable valve core member, means for operating said rotatable member including a helical couple operatively connected to the operating member and said rotatable member, and means for moving one member of said couple axially to cause a relative rotation of the couple members.

ALFRED G. HEGGEM.